United States Patent
Youk et al.

(10) Patent No.: US 10,040,878 B2
(45) Date of Patent: Aug. 7, 2018

(54) VINYL CHLORIDE POLYMER AND PREPARATION METHOD THEREOF

(71) Applicant: LG CHEM, LTD., Seoul (KR)

(72) Inventors: Kyung Seog Youk, Daejeon (KR); Hyun Min Lee, Daejeon (KR); Chan Hee Lee, Daejeon (KR); Heung Kwon Bae, Daejeon (KR); Kwang Jin Lee, Daejeon (KR); Kyung Hyun Kim, Daejeon (KR); Jung Rae Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 92 days.

(21) Appl. No.: 15/101,803

(22) PCT Filed: Sep. 14, 2015

(86) PCT No.: PCT/KR2015/009641
§ 371 (c)(1),
(2) Date: Jun. 3, 2016

(87) PCT Pub. No.: WO2016/047953
PCT Pub. Date: Mar. 31, 2016

(65) Prior Publication Data
US 2016/0304636 A1    Oct. 20, 2016

(30) Foreign Application Priority Data

Sep. 23, 2014  (KR) .................. 10-2014-0127047
Sep. 23, 2014  (KR) .................. 10-2014-0127048
Sep. 23, 2014  (KR) .................. 10-2014-0127049
Aug. 27, 2015  (KR) .................. 10-2015-0121273

(51) Int. Cl.
| *C08F 14/06* | (2006.01) |
| *C08F 114/06* | (2006.01) |
| *C08F 8/32* | (2006.01) |
| *C08F 8/40* | (2006.01) |

(52) U.S. Cl.
CPC ............ *C08F 114/06* (2013.01); *C08F 14/06* (2013.01); *C08F 8/32* (2013.01); *C08F 8/40* (2013.01)

(58) Field of Classification Search
CPC ....... C08F 14/06; C08F 114/06; C08F 214/06; C08F 8/32; C08F 8/40
See application file for complete search history.

(56) References Cited

U.S. PATENT DOCUMENTS

| 2,482,038 | A | 9/1949 | Temple |
| 2003/0027881 | A1 | 2/2003 | Sunagawa et al. |
| 2006/0025552 | A1 | 2/2006 | Kaiser et al. |
| 2012/0226000 | A1* | 9/2012 | Percec .............. C08F 214/06 |
| | | | 525/419 |

FOREIGN PATENT DOCUMENTS

| CN | 1156156 A | 8/1997 |
| CN | 1756777 A | 4/2006 |
| CN | 103119073 A | 5/2013 |
| DE | 2125586 A1 | 12/1972 |
| EP | 0107063 A1 | 5/1984 |
| JP | 06-192523 A | 7/1994 |
| JP | 06184220 A | 7/1994 |
| JP | 2501322 B2 | 5/1996 |
| JP | 09137023 A | 5/1997 |
| JP | 09-241309 A | 9/1997 |
| KR | 10-2002-0037769 A | 5/2002 |
| KR | 20040050468 A | 6/2004 |
| KR | 10-2010-0005283 A | 1/2010 |
| KR | 20110006224 A | 1/2011 |
| KR | 20120007227 A | 1/2012 |
| KR | 10-2012-0130801 A | 12/2012 |

* cited by examiner

*Primary Examiner* — Roberto Rabago
(74) *Attorney, Agent, or Firm* — Dentons US LLP

(57) ABSTRACT

The present invention relates to a vinyl chloride polymer having good thermal stability due to the restraint of dehydrochlorination by heat or ultraviolet rays, and a method of preparing the same. The generation of the dehydrochlorination of the vinyl chloride polymer due to heat or ultraviolet rays may be markedly restrained, the thermal stability thereof may be improved, and the discoloration thereof or the modification of the physical properties thereof may be prevented. In addition, a modifier may be introduced to a polymerization process at the end of the polymerization, and high thermal stability may be attained without generating the transformation of the vinyl chloride polymer.

13 Claims, 4 Drawing Sheets

[Fig.1A]
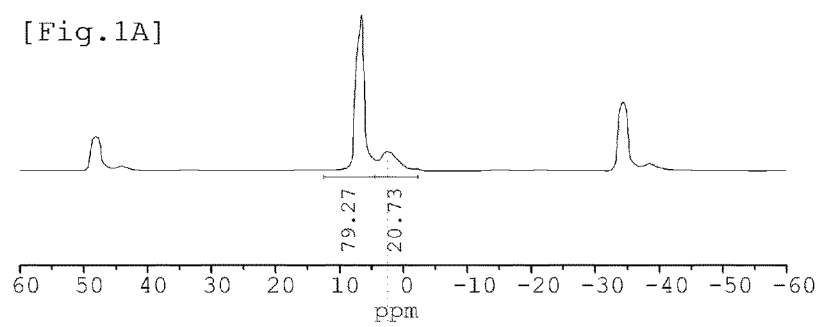
[Fig.1B]
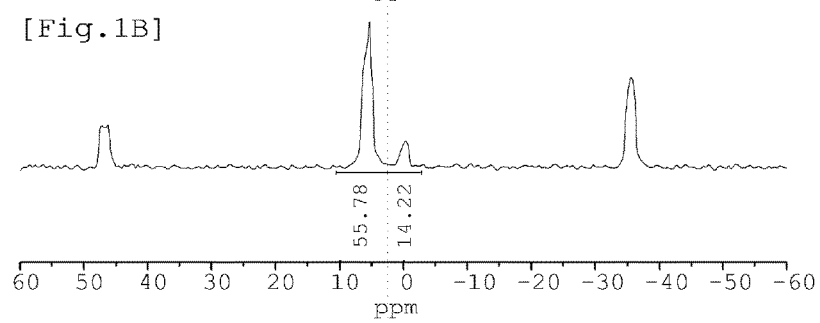
[Fig.1C]
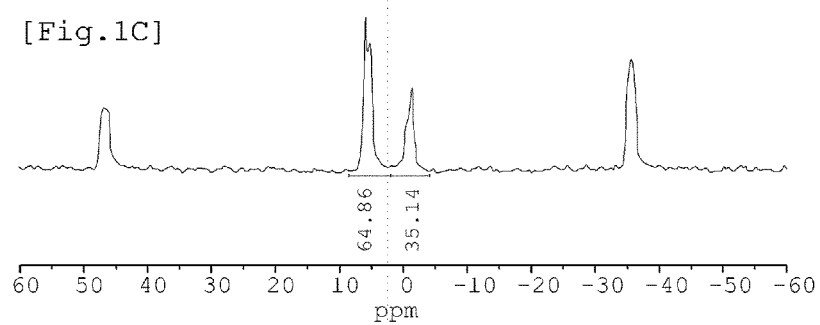
[Fig.1D]
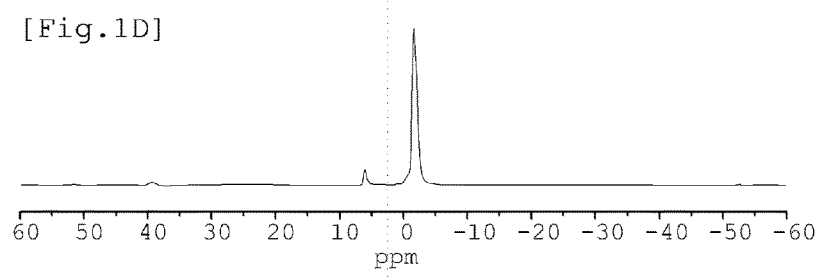

[Fig. 2]
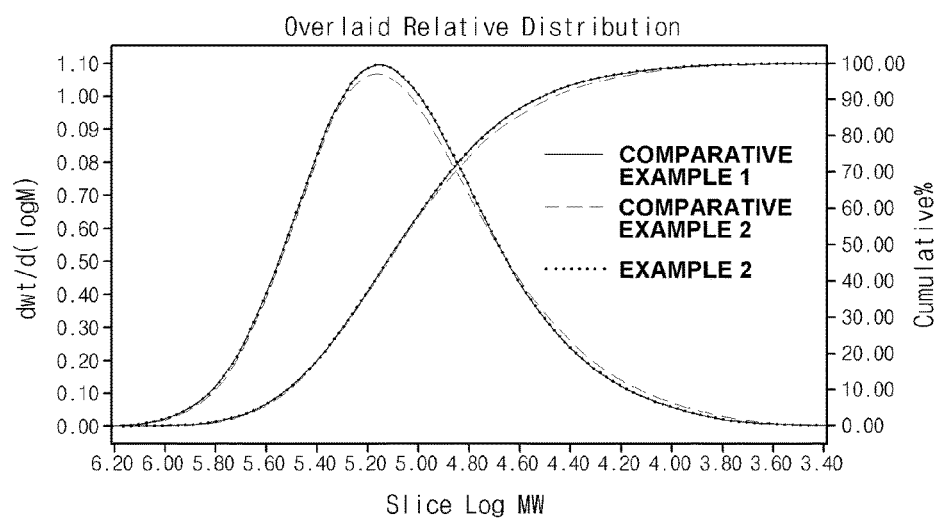

[Fig. 3]
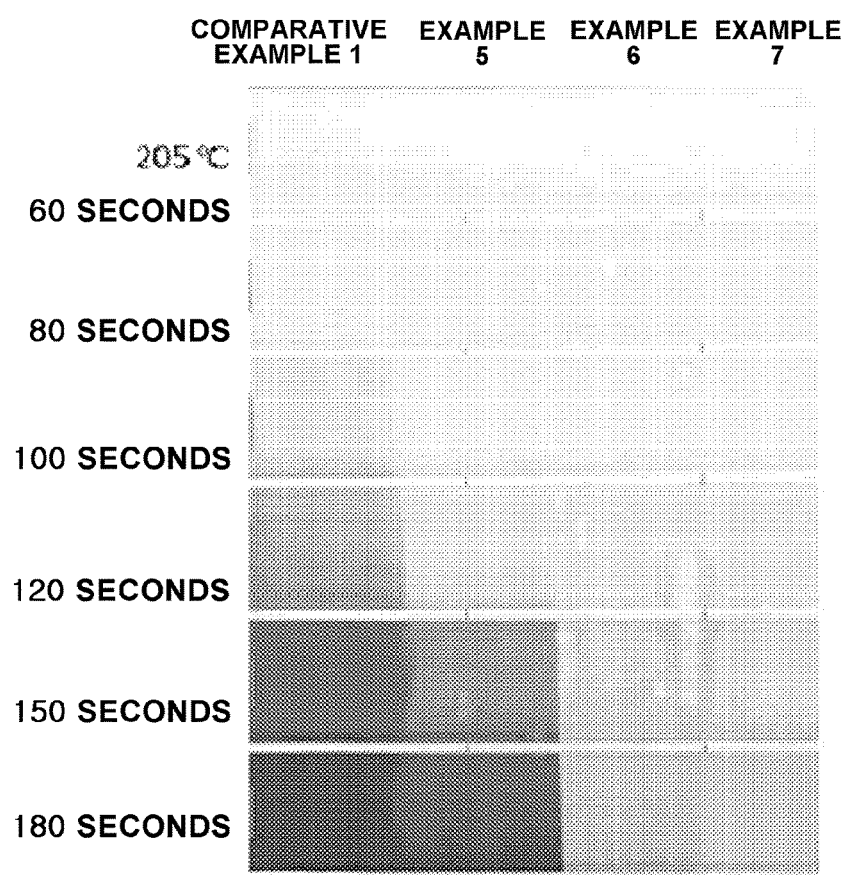

[Fig. 4]
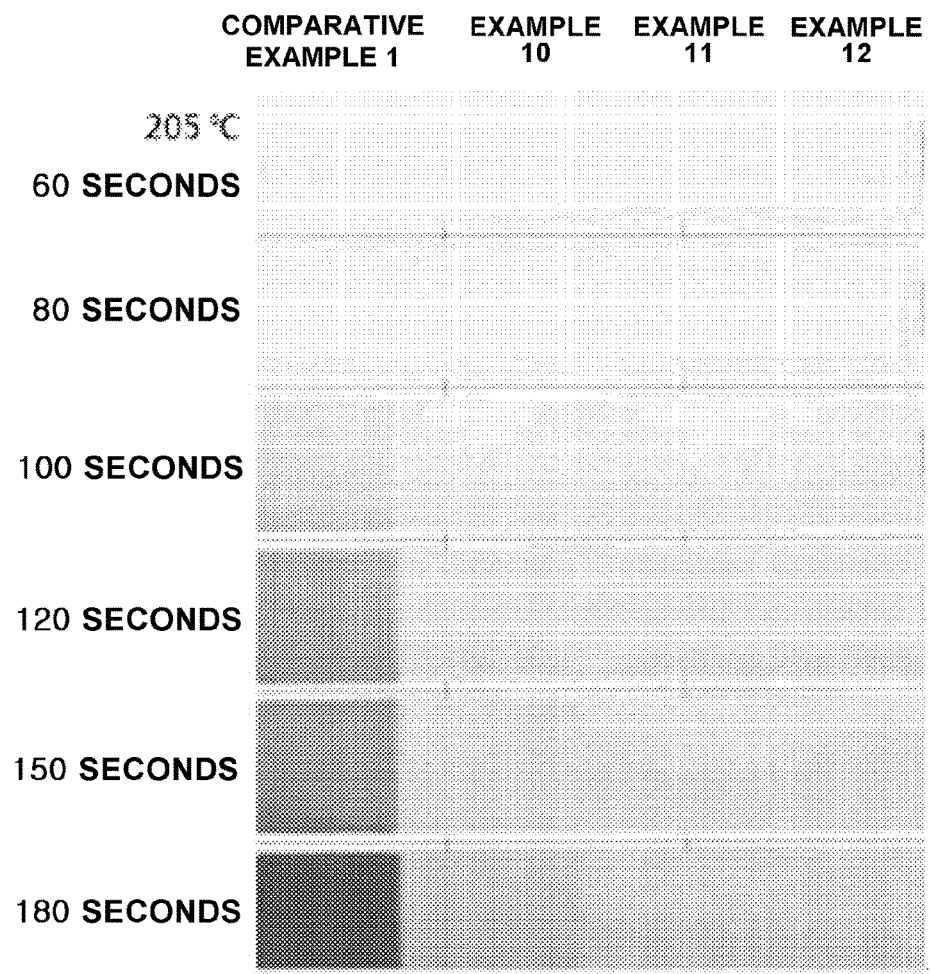

VINYL CHLORIDE POLYMER AND PREPARATION METHOD THEREOF

CROSS-REFERENCE TO RELATED APPLICATIONS

This application is a National Stage Entry of International Application No. PCT/KR2015/009641, filed on Sep. 14, 2015, and claims the benefit of and priority to Korean Application No. 10-2014-0127047, filed on Sep. 23, 2014, Korean Application No. 10-2014-0127048, filed on Sep. 23, 2014, Korean Application No. 10-2014-0127049, filed on Sep. 23, 2014, and Korean Application No. 10-2015-0121273, filed on Aug. 27, 2015, all of which are hereby incorporated by reference in their entirety for all purposes as if fully set forth herein.

TECHNICAL FIELD

The present invention relates to a vinyl chloride polymer having good thermal stability due to the restraint of dehydrochlorination by heat or ultraviolet rays, and a method of preparing the same.

BACKGROUND ART

A vinyl chloride polymer is a polymer including 50% or more of vinyl chloride, is cheap, allows easy control of hardness, is applicable in most processing equipments and has diverse application fields. In addition, the vinyl chloride polymer may provide a molded product having good physical and chemical properties such as mechanical strength, climate resistance and chemical resistance, and is widely used in diverse fields.

However, the vinyl chloride polymer may induce dehydrochlorination due to the defects of chemical structures, generated during a polymerization reaction by heat or ultraviolet rays applied during processing and may induce the discoloration of a resin or the deterioration of physical properties.

Particularly, in a vinyl chloride polymer, chemical defects generated during a polymerization reaction, i.e., the defects of the chemical structures of allyl chloride and tertiary chloride are present. Due to the defects of the chemical structure, the binding energy of carbon with chlorine in the vinyl chloride polymer may be much lower than that of carbon with chlorine in a normal molecular structure, and the bonding between carbon and chlorine may be easily broken due to external radical transfer during processing the vinyl chloride polymer. Separated hydrogen chloride from a polymer chain accelerates other side reactions through an auto-catalyst reaction to produce another hydrogen chloride continuously. In addition, a double bond may be formed at the site from where the hydrogen chloride has been removed, and a number of double bonds may be overlapped to generate the discoloration of a resin and the deterioration of physical properties. That is, in a vinyl chloride polymer or a molded product processed therefrom, a dehydrochlorination reaction may be generated due to heat or ultraviolet rays, thereby generating the discoloration defects of a vinyl chloride polymer or the deterioration or change of physical properties.

In order to improve the limitations of the vinyl chloride polymer, an organometallic compound containing a metal such as Ba, Zn, Ca and Pb has been mixed with the vinyl chloride polymer to restrain the generation of radicals or ions during thermal decomposition of the vinyl chloride polymer and to control the thermal decomposition rate of a resin. Recently, a method of using a thermal stabilizer of diverse types such as a metallic material or an organic compound has been introduced. However, the use thereof is limited due to environmental problems caused by the use of a heavy metal stabilizer and high price.

A method of blending a polymer having good heat resistance with a vinyl chloride polymer has been suggested to complement weak physical properties however is not easily used due to low miscibility with the vinyl chloride polymer and difficulty in processing.

With such a background, the inventors of the present disclosure studied on a method of improving the thermal stability of a vinyl chloride polymer by effectively restraining a dehydrochlorination reaction (a dehydrochloric acid reaction), prepared a vinyl chloride polymer by adding at least one modifier of oxycarboxylates, inorganic phosphates, or ethylenediamine tetraacetates to a vinyl chloride monomer and emulsion polymerizing, measured the generation degree of scale, the amount of dehydrochloric acid and thermal stability (Yellowness Index), found that the generation degree of the scale is extremely small, the amount of dehydrochloric acid is decreased, and the thermal stability (Yellowness Index) is improved, and achieved the present invention.

DISCLOSURE OF THE INVENTION

Technical Problem

The present invention provides a vinyl chloride polymer having improved thermal stability by restraining the dehydrochlorination reaction of a vinyl chloride polymer due to heat or ultraviolet rays.

The present invention also provides a method of preparing the vinyl chloride polymer.

Technical Solutions

According to an aspect of the present invention, there is provided a vinyl chloride polymer including modifier-derived unit, wherein the modifier is at least one selected from the group consisting of oxycarboxylates, inorganic phosphates, and ethylenediamine tetraacetates, wherein a polydispersity index (PDI) of the vinyl chloride polymer is from 2.1 to 2.4.

According to another aspect of the present invention, there is provided a method of preparing the vinyl chloride polymer including a step of adding a modifier to a vinyl chloride monomer, and polymerizing, wherein the modifier is at least one selected from the group consisting of oxycarboxylates, inorganic phosphates, and ethylenediamine tetraacetates.

Effects of the Invention

According to the vinyl chloride polymer of the present invention, the generation degree of scale may be markedly low, the generation of dehydrochlorination due to heat or ultraviolet rays may be markedly restrained, the thermal stability thereof may be improved, and the discoloration thereof or the modification of the physical properties thereof may be prevented.

In addition, according to the preparation method through emulsion polymerization, the transformation of the vinyl chloride polymer may not be generated, and high thermal stability thereof may be attained.

Accordingly, the vinyl chloride polymer and the method of preparing the same through the emulsion polymerization may be readily applied to an industry requiring the vinyl chloride polymer, for example, industries concerning a vinyl chloride resin and a molded product thereof.

BRIEF DESCRIPTION OF THE DRAWINGS

The accompanying drawings in the present disclosure illustrate preferred embodiments of the present invention, and serve to further understanding of the principles of the present invention together with the description. The present invention should not be construed as limited to the description in the drawings.

FIG. 1A, FIG. 1B, FIG. 1C and FIG. 1D respectively illustrates PNMR analysis results of a vinyl chloride polymer of Example 1 prepared according to an embodiment of the present invention;

FIG. 2 is a graph illustrating analysis results of polydispersity index of a vinyl chloride polymer of Example 2 prepared according to an embodiment of the present invention and vinyl chloride polymers prepared in Comparative Examples 1 and 2;

FIG. 3 illustrates color changes of vinyl chloride polymers of Examples 5 to 7 prepared according to embodiments of the present invention and a vinyl chloride polymer prepared according to Comparative Example 1 with respect to time; and FIG. 4 illustrates color changes of vinyl chloride polymers of Examples 10 to 12 prepared according to embodiments of the present invention and a vinyl chloride polymer prepared according to Comparative Example 1 with respect to time.

BEST MODE FOR CARRYING OUT THE INVENTION

Hereinafter, the present invention will be explained in more detail to assist the understanding of the present invention.

It will be further understood that terms or words used in the description and claims should not be interpreted as having a meaning such as those defined in commonly used dictionaries, however should be interpreted as having a meaning and concept that is consistent with the technical spirit of the present invention on the basis of a principle that an inventor may define the concept of terms appropriately to explain his invention by the best way.

The present invention provides a vinyl chloride polymer having good thermal stability, and low discoloration degree due to heat and ultraviolet rays.

In an embodiment according to the present invention, a vinyl chloride polymer includes a vinyl chloride monomer-derived unit and modifier-derived unit, wherein the modifier is at least one selected from the group consisting of oxycarboxylates, inorganic phosphates and ethylenediamine tetraacetates, and a polydispersity index (PDI) of the vinyl chloride polymer is from 2.1 to 2.4.

In an embodiment, the vinyl chloride polymer may have a weight average molecular weight from 10,000 g/mol to 20,000 g/mol.

The weight average molecular weight of the vinyl chloride polymer was measured using gel permeation chromatography (GPC) after completely dissolving 0.02 g of the vinyl chloride polymer in 20 ml of tetrahydrofuran (THF) and filtering (using a filter of 0.45 μm). The polydispersity index was obtained after measuring a number average molecular weight by the same method as that for measuring the weight average molecular weight and obtaining the ratio (Mw/Mn) of the weight average molecular weight (Mw) and the number average molecular weight (Mn).

The vinyl chloride polymer includes the vinyl chloride monomer-derived unit and the modifier-derived unit as described above, and the vinyl chloride polymer includes the modifier-derived unit in an amount ratio from 0.001 to 10 parts by weight relative to 100 parts by weight of the vinyl chloride monomer-derived unit. If the vinyl chloride polymer includes the modifier-derived unit in an amount of less than 0.001 parts by weight, the restraining effect of the dehydrochlorination reaction would be trivial, and the improving effect of the thermal stability of the vinyl chloride polymer may be deteriorated, and if the vinyl chloride polymer includes the modifier-derived unit in an amount of greater than 10 parts by weight, the viscosity of a plastisol would increase during processing the vinyl chloride polymer thus prepared, and the processability thereof may be deteriorated, thereby deteriorating the coloring property of a molded product processed therefrom.

Particularly, the vinyl chloride polymer may include the vinyl chloride monomer-derived unit and the modifier-derived unit, and at least a portion of the modifier-derived unit is bonded with the vinyl chloride monomer-derived unit. That is, the vinyl chloride polymer according to an embodiment of the present invention may include a vinyl chloride monomer-derived unit bonded with the modifier-derived unit together with that not bonded with the modifier-derived unit. For example, the vinyl chloride polymer may include a vinyl chloride monomer-derived unit combined with a modifier-derived unit as represented by the following Formula 1 together with a separate modifier-derived unit.

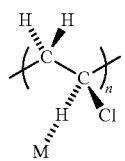

[Formula 1]

In Formula 1, M represents a modifier-derived unit.

Here, the expression of "derived unit" may represent a structure or a component produced from a certain material and may represent a material itself. For example, the vinyl chloride monomer-derived unit may be a structure or a component produced from the vinyl chloride monomer or a vinyl chloride monomer itself.

In addition, the expression of "at least one" means a portion of the whole, and may represent at least one where the whole is ten.

Particularly, in a vinyl chloride monomer-derived unit bonded with the modifier-derived unit, represented by the above Formula 1 and included in the vinyl chloride polymer, the modifier-derived unit may be bonded with one side of the vinyl chloride monomer-derived unit by electrostatic attraction, and a modification ratio due to the modifier-derived unit may be from 0.01 mol % to 2.5 mol %. The modification ratio may represent the ratio of at least a portion of the modifier-derived unit bonded with the vinyl chloride monomer-derived unit.

The combination of the vinyl chloride monomer-derived unit and the modifier-derived unit by the electrostatic attraction may be changed into a covalent bond according to the application of heat. In this case, a dehydrochlorination reaction generated due to the application of the heat may be restrained. Therefore, the dehydrochlorination reaction of the vinyl chloride polymer including the vinyl chloride monomer-derived unit bonded with the modifier-derived unit may be restrained, and good heat resistance may be attained.

More particularly, the vinyl chloride polymer according to an embodiment of the present invention may include an inorganic phosphate modifier-derived unit, and in this case, may satisfy the following Mathematical Formula 1.

$$0.01 \leq B/A \leq 0.5 \qquad \text{[Mathematical Formula 1]}$$

in Mathematical Formula 1,

A is an integral value of peaks appeared in a range from 5 ppm to 10 ppm in phosphorus-31 solid state nuclear magnetic resonance (PNMR), and B is an integral value of peaks appeared in a range from −5 ppm to 5 ppm in PNMR.

In addition, in the case where the vinyl chloride polymer includes the inorganic phosphate modifier-derived unit, the structure may be changed by forming a covalent bond according to the application of heat to the polymer. In this case, the following Mathematical Formula 2 may be satisfied.

$$0.01 \leq D/C \leq 0.8 \qquad \text{[Mathematical Formula 2]}$$

in Mathematical Formula 2,

C is an integral value of peaks appeared in a range from 2.5 ppm to 7.5 ppm in PNMR after leaving the polymer at 205° C. for 210 seconds, and D is an integral value of peaks appeared in a range from −5 ppm to 2.5 ppm in PNMR after leaving the polymer at 205° C. for 210 seconds.

In the present invention, PNMR is measured using an Agilent 600 MHz DD2 solid state NMR apparatus. In this case, the measurement was conducted using a 3.2 mm HFXY solid probe with a pulse width of 6.8 sec, a recycle delay of 20 sec, a scan number of 1024, and a spinning rate of 10 kHz.

The vinyl chloride monomer according to an embodiment of the present invention may mean a pure vinyl chloride monomer or a mixture of a vinyl chloride monomer and a vinyl monomer copolymerizable therewith.

That is, the vinyl chloride monomer-derived unit may include the pure vinyl chloride monomer-derived unit and a derived unit by the copolymerization of the vinyl chloride monomer as a main component with the vinyl monomer copolymerizable with the vinyl chloride monomer. In the case where the vinyl chloride monomer-derived unit is derived from the copolymerization of the vinyl chloride monomer with the vinyl monomer, vinyl chloride may preferably be included in the copolymer in a ratio of 50% or more.

The vinyl monomer copolymerizable with the vinyl chloride monomer is not specifically limited, however may include an olefin compound such as ethylene, propylene, and butane; vinyl esters such as vinyl acetate, vinyl propionate, and vinyl stearate; unsaturated nitriles such as acrylonitrile; vinyl alkyl ethers such as vinyl methyl ether, vinyl ethyl ether, vinyl octyl ether, and vinyl lauryl ether; vinylidene halide such as vinylidene chloride, unsaturated fatty acid and anhydrides of the fatty acid such as acrylic acid, methacrylic acid, itaconic acid, maleic acid, fumaric acid, maleic anhydride, and itaconic anhydride; unsaturated fatty acid esters such as methyl acrylate, ethyl acrylate, monomethyl maleate, dimethyl maleate, and butylbenzyl maleate; a crosslinking monomer such as diallyl phthalate. The vinyl monomers may be used alone or as a mixture of two or more.

The oxycarboxylate is not specifically limited, however may be citric acid or trisodium citrate.

The ethylenediamine tetraacetate is not specifically limited, however may be disodium ethylenediamine tetraacetic acid or tetrasodium ethylenediamine tetraacetic acid, and may particularly be the tetrasodium ethylenediamine tetraacetic acid.

The inorganic phosphate is not specifically limited, however may be disodium diphosphate or tetra-sodium diphosphate, and may particularly be the tetra-sodium diphosphate.

The vinyl chloride polymer according to the present invention may have a glass transition temperature from 70° C. to 90° C., and an average particle diameter from 0.01 μm to 10 μm. Particularly, the glass transition temperature of the vinyl chloride polymer may be from 75° C. to 85° C., and the average particle diameter thereof may be from 0.1 μm to 5 μm. The vinyl chloride polymer according to the present invention may be polymerized by the following polymerization process, and may have uniform and minute average particle diameter, good viscosity property and molding processability.

There is provided a method of preparing a vinyl chloride polymer having good thermal stability and a low discoloration degree due to heat and ultraviolet rays.

The preparation method according to an embodiment of the present invention is characterized in including a step of adding a modifier to a vinyl chloride monomer and polymerizing the monomer (step A), and the modifier is at least one selected from the group consisting of oxycarboxylates, inorganic phosphates and ethylenediamine tetraacetates.

Step A is for preparing a vinyl chloride polymer including a vinyl chloride monomer-derived unit and a modifier-derived unit by polymerizing a vinyl chloride monomer in the presence of a modifier.

The polymerization may be emulsion polymerization, and particularly, micro-seed emulsion polymerization, microemulsion polymerization or pure emulsion polymerization.

Hereinafter, the micro-seed emulsion polymerization, the microemulsion polymerization and the pure emulsion polymerization will be explained in detail item by item.

Micro-Seed Emulsion Polymerization

If the polymerization is the micro-seed emulsion polymerization, the emulsion polymerization may include a step of preparing a seed mixture including a first seed and a second seed (step i); and a step of adding a vinyl chloride monomer and a modifier to the seed mixture and conducting polymerization (step ii). In this case, the seed mixture may be used in an amount ratio from 1 to 20 parts by weight relative to 100 parts by weight of the vinyl chloride monomer. In addition, the micro-seed emulsion polymerization may be conducted by continuously adding a first emulsifier during polymerization.

Step i is a step of preparing a seed mixture by mixing a first seed and a second seed, which have different average diameters to increase the binding force of a vinyl chloride monomer and to impart the vinyl chloride polymer finally produced with bimodal effect. The seed mixture may be obtained by mixing the first seed and the second seed in an appropriate weight ratio according to purpose, without specific limitation. The first seed may have an average particle diameter from 0.5 μm to 1.0 μm, and the second seed may have an average particle diameter from 0.05 μm to 0.5 μm.

Hereinafter, the first seed will be explained in particular.

The first seed may be prepared by adding 100 parts by weight of a vinyl chloride monomer and 0.1 to 5 parts by weight of a first emulsifier to a reactor filled with a polymerization initiator and homogenizing, followed by emulsion polymerizing at from 30° C. to 70° C.

The reactor filled with the polymerization initiator may be a reactor containing a mixture solution including the polymerization initiator, and the mixture solution may further include polymerization water, a separate emulsifier, a reaction inhibitor, and a dispersant other than the polymerization initiator, without limitation.

The polymerization initiator may preferably be used in an amount ratio from 0.01 to 3 parts, or 0.01 to 2 parts by weight on the basis of 100 parts by weight of the vinyl chloride monomer, and the average particle diameter of the first seed finally produced may be controlled by the amount used of the polymerization initiator. For example, as the amount used of the polymerization initiator increases, the average particle diameter of the first seed finally produced may decrease.

The kind of the polymerization initiator is not specifically limited, and at least one of a water soluble initiator and an oil soluble initiator may be used. For example, at least one selected from the group consisting of peroxy carbonates, peroxy esters, and azo compounds may be used. Particularly, diisopropyl peroxy dicarbonate, t-butyl peroxy pivalate, t-butyl peroxy neodecanoate, 2,2-azobisisobutyronitrile, etc. may be used, or a mixture of two or more thereof may be used as the polymerization initiator. Particularly, the polymerization initiator may be lauryl peroxide (LPO), di-2-ethylhexyl peroxycarbonate (OPP), or a mixture thereof.

The emulsifier may be a known material in this art or the same material as the first emulsifier to be described below. The reaction inhibitor may be paraquinone, etc. In addition, the dispersant is not specifically limited, however may include, for example, a higher alcohol such as lauryl alcohol, myristic alcohol, and stearyl alcohol, or a higher fatty acid such as lauric acid, myristic acid, palmitic acid, and stearic acid.

The homogenization is not specifically limited and may be conducted by homogenizing at a temperature of 20° C. or less, particularly at a temperature from 5° C. to 15° C. for 1 to 3 hours using a homogenizer. In this case, the homogenizer is not specifically limited and a commonly known one in this art, for example, a rotor-stator type homogenizer, may be used.

The polymerization may be conducted at a temperature from 30° C. to 70° C. as described above, and may particularly be conducted by elevating the homogenizing temperature to a temperature from 40° C. to 50° C. to initiate emulsion polymerization and conducting polymerization for 5 to 15 hours.

Hereinafter, the second seed will be explained in particular.

The second seed may be prepared by the following method:

a) a step of adding 100 parts by weight of a vinyl chloride monomer to a reactor filled with a first emulsifier and initiating polymerization at a temperature from 30° C. to 70° C.; and b) continuously adding a second emulsifier during polymerization and emulsion polymerizing for 4 to 10 hours.

The reactor filled with the first emulsifier in step a) represents a reactor including an emulsion solution containing the first emulsifier, and the emulsion solution may include polymerization water, a polymerization initiator, etc. other than the first emulsifier.

The first emulsifier may be used in an amount ratio from 0.01 to 1 parts by weight on the basis of 100 parts by weight of the vinyl chloride monomer, and the average particle diameter of the second seed finally formed may be controlled by the amount used of the first emulsifier. For example, the average particle diameter of the finally formed second seed may increase according to the increase of the amount used of the first emulsifier.

The polymerization initiator may preferably be a water soluble initiator and may be at least one selected from the group consisting of potassium persulfate, ammonium persulfate, and hydrogen peroxide.

The second emulsifier in step b) may be continuously added to the reactor during emulsion polymerizing and may be used in an amount ratio from 0.01 to 6 parts by weight on the basis of 100 parts by weight of the vinyl chloride monomer.

The first emulsifier and the second emulsifier used for preparing the first seed and the second seed may be the same material, and may preferably be different materials. Particularly, the first emulsifier and the second emulsifier may be at least one selected from the group consisting of sodium lauryl sulfate, lauryl benzene sulfonic acid, alpha-olefin sulfonate, sodium lauryl ethoxylated sulfate, sodium octadecyl sulfate, sodium lauryl ether sulfate, and linear alkylbenzene sulfonate.

Step ii is a step of adding a vinyl chloride monomer to a seed mixture of the first seed and the second seed prepared in step i, and emulsion polymerizing. The emulsion polymerization may include a step of injecting a modifier and a first emulsifier.

The emulsion polymerization in step ii is not limited thereto, however may be conducted by adding a vinyl chloride monomer, a modifier, and a first emulsifier to a vacuum reactor including a mixture of the seed mixture and polymerization water, and conducting a reaction. The modifier may be added together with the vinyl chloride monomer before initiating polymerization or particularly at an appropriate time according to polymerization conversion ratio, and more particularly at a point when a polymerization conversion ratio is 50% or more. Still more particularly, the modifier may be added at a point when a polymerization conversion ratio is from 80% to 95%. In addition, the first emulsifier may be continuously added during emulsion polymerization, and the emulsion polymerization may be conducted by additionally adding an additive such as a polymerization initiator, a molecular weight controller, and an electrolyte as occasion demands.

Particularly, the polymerization may be conducted by a method including steps of adding 100 parts by weight of a vinyl chloride monomer to a vacuum reactor including 70 to 120 parts by weight of polymerization water and 1 to 20 parts by weight of a seed mixture on the basis of 100 parts by weight of the vinyl chloride monomer, initiating polymerization at a temperature from 30° C. to 70° C., and adding 0.001 to 10 parts by weight of a modifier on the basis of 100 parts by weight of the vinyl chloride monomer. The modifier may be added before initiating polymerization as described above, according to the polymerization conversion ratio. In addition, 0.2 to 2.5 parts by weight of a first emulsifier on the basis of 100 parts by weight of the vinyl chloride monomer may be continuously added during the reaction, and 0.1 to 1.5 parts by weight of a polymerization initiator, 0.5 to 2 parts by weight of an electrolyte, and 0.1 to 1 parts by weight of a molecular weight controller on the basis of 100 parts by weight of the vinyl chloride monomer may be additionally added as additives as occasion demands.

In this case, the modifier and the polymerization initiator may be the same as those described above, and the emulsifier may be the same as the first emulsifier and the second emulsifier as described above.

The molecular weight controller is not specifically limited, however may be, for example, n-butyl mercaptan, n-octyl mercaptan, n-dodecyl mercaptan, t-dodecyl mercaptan, etc.

The electrolyte is not specifically limited, however may be at least one selected from the group consisting of potassium chloride, sodium chloride, potassium bicarbonate, sodium carbonate, potassium carbonate, potassium hydrogen sulfite, sodium hydrogen sulfite, potassium pyrophosphate, sodium pyrophosphate, tripotassium phosphate, dipotassium hydrogen phosphate, and disodium hydrogen phosphate.

Microemulsion Polymerization

If the polymerization is microemulsion polymerization, the polymerization may be conducted by the steps of injecting an oil soluble polymerization initiator, and a vinyl chloride monomer to a reactor filled with a first emulsifier, homogenizing, injecting a modifier, and polymerizing.

The reactor filled with the first emulsifier represents a reactor including a mixture solution containing a first emulsifier, and the mixture solution may include an additive such as polymerization water, a reaction inhibitor, and a dispersant other than the first emulsifier, without limitation. The additive may be the same as those described above.

The first emulsifier may be injected in an amount ratio of 0.1 to 5 parts by weight on the basis of 100 parts by weight of the vinyl chloride monomer, and the particular kind of the first emulsifier may be the same as those described above.

The oil soluble polymerization initiator may be added in an amount ratio of 0.01 to 2 parts by weight relative to 100 parts by weight of the vinyl chloride monomer, and may include, for example, at least one selected from the group consisting of cumene hydro peroxide, diisopropyl benzene hydroperoxide, azobisisobutyronitrile, tertiary butyl hydroperoxide, paramentane hydro peroxide, benzoylperoxide, and di-2-ethylhexyl peroxydicarbonate, known in the art, without limitation.

The modifier may be added at a point when a polymerization conversion ratio is 50% and more, and may more particularly be added at a point when a polymerization conversion ratio is from 80% to 95%.

The homogenization may be conducted by the same method described above, and the additives such as polymerization water, a reaction inhibitor, and a dispersant, and the amounts thereof are the same as those described above.

Pure Emulsion Polymerization

If the polymerization is pure emulsion polymerization, the polymerization may be conducted by adding a vinyl chloride monomer to a reactor filled with a first emulsifier and a water soluble polymerization initiator, and conducting a polymerization reaction, and the polymerization reaction may be conducted while continuously adding a second emulsifier. The reactor filled with a mixture of the first emulsifier and the water soluble polymerization initiator represents a reactor including a mixture containing the first emulsifier and the water soluble polymerization initiator. The mixture may further include an additive such as polymerization water, a dispersant, and a reaction inhibitor other than the first emulsifier and the water soluble polymerization initiator, and the additives may be the same as those described above.

The first emulsifier may be used in an amount ratio of from 0.02 to 0.4 parts by weight on the basis of 100 parts by weight of the vinyl chloride monomer, and the kind of the first emulsifier may be the same as those described above.

The water soluble polymerization initiator may be used in an amount ratio from 0.01 to 2 parts by weight on the basis of 100 parts by weight of the vinyl chloride monomer, and the water soluble polymerization initiator may be the same as those described above.

In addition, the second emulsifier may be continuously added to the reactor during polymerizing and may be used in an amount ratio from 0.01 to 6 parts by weight on the basis of 100 parts by weight of the vinyl chloride monomer, and the second emulsifier may be the same as those described above.

The modifier may be added at a point when a polymerization conversion ratio is 50% or more, and more particularly, at a point when a polymerization conversion ratio is from 80% to 95%.

The preparation method according to the present invention may further include a step of washing, flocculating, and drying after emulsion polymerizing. The drying is not specifically limited and may be conducted by a commonly known method to a person skilled in the art.

According to the method of preparing a vinyl chloride polymer via the emulsion polymerization, the modifier may be included in the vinyl chloride polymer without inducing the modification of the vinyl chloride polymer finally produced. Therefore, the thermal stability of the vinyl chloride polymer may be markedly increased by restraining the dehydrochlorination reaction in case of exposing the vinyl chloride polymer to heat or ultraviolet rays. Thus, the discoloration and the modification of the vinyl chloride polymer due to heat or ultraviolet rays may be prevented.

Hereinafter, the present invention will be explained in more detail referring to the following examples and experimental examples. However, the examples and the experimental examples are for illustrating the present invention, and the scope of the present invention is not limited thereto.

Preparation Example 1

110 parts by weight (73 kg) of de-ionized water, 1.83 parts by weight (1.21 kg) of lauryl peroxide (LPO), and 0.001 parts by weight (0.9 g) of paraquinone were injected to a 200 L, high pressure reactor, followed by making the inner side of the reactor vacuous by reducing the pressure to −730 mmHg. To the reactor in a vacuum state, 100 parts by weight (66 kg) of a vinyl chloride monomer and 11.8 parts by weight (7.8 kg) of sodium dodecyl benzene sulfonate (15%) were injected, followed by stirring for 15 minutes. The inner temperature of the reactor was decreased to 20° C. or less, and homogenization was conducted for 2 hours using a rotor-stator type homogenizer. After completing homogenizing, the inner temperature of the reactor was controlled to 42° C. to allow polymerizing reaction. After 558 minutes, the pressure in the reactor reached 3.5 kg/cm$^2$, and the reaction was finished. Unreacted vinyl chloride monomer was recovered and removed to obtain a first seed having an average particle diameter of 0.68 µm.

Preparation Example 2

124 parts by weight (230 kg) of polymerization water, 0.54 parts by weight of a first emulsifier (lauric acid 790 g/NaOH 240 g), and 0.059 parts by weight (110 g) of potassium persulfate (KPS) were injected to a 500 L, high pressure reactor, followed by stirring and making the reactor vacuous. 100 parts by weight (185 kg) of a vinyl chloride monomer was injected to the reactor in a vacuum state, followed by elevating the temperature in the reactor to 56°

C. to initiate polymerization. After initiating polymerization, 6 parts by weight (11.1 kg) of a second emulsifier (sodium dodecyl benzene sulfonate) was continuously injected to the reactor for 5 hours. After the pressure in the reactor reached 4 kg/cm$^2$, the reaction was finished. Unreacted vinyl chloride monomer was recovered and removed to obtain a second seed having an average particle diameter of 0.12 μm.

Example 1

70 parts by weight (150 kg) of de-ionized water, 7 parts by weight (15 kg) of the first seed prepared in Preparation Example 1, and 2.8 parts by weight (6 kg) of the second seed prepared in Preparation Example 2 were injected to a 500 L, high pressure reactor, followed by stirring and making the reactor vacuous. 100 parts by weight (215 kg) of a vinyl chloride monomer was injected to the reactor in a vacuum state, followed by elevating the temperature in the reactor to 58° C. to initiate emulsion polymerization. After initiating polymerization, 0.7 parts by weight (1.5 kg) of sodium dodecyl benzene sulfonate was continuously injected to the reactor, followed by stirring for 300 minutes to allow the reaction. 5 parts by weight of tetrasodium diphosphate (TSDP) relative to 100 parts by weight of the vinyl chloride monomer was injected and introduced to the reaction after initiating polymerization and at a point when a polymerization conversion ratio was 50%. After the pressure in the reactor reached 4.0 kg/cm$^2$, the reaction was finished, and unreacted vinyl chloride monomer was recovered and removed to obtain a vinyl chloride polymer.

Example 2

A vinyl chloride polymer was obtained by conducting the same procedure described in Example 1 except for injecting 0.1 parts by weight of tetrasodium diphosphate (TSDP).

Example 3

A vinyl chloride polymer was obtained by conducting the same procedure described in Example 1 except for injecting 0.1 parts by weight of tetrasodium ethylenediamine tetraacetate (EDTA-4Na) instead of tetrasodium diphosphate (TSDP).

Example 4

A vinyl chloride polymer was obtained by conducting the same procedure described in Example 1 except for injecting 0.1 parts by weight of trisodium citrate instead of tetrasodium diphosphate (TSDP).

Example 5

A vinyl chloride polymer was obtained by conducting the same procedure described in Example 1 except for injecting 0.1 parts by weight of tetrasodium diphosphate (TSDP) at a point when a polymerization conversion ratio was 80%.

Example 6

A vinyl chloride polymer was obtained by conducting the same procedure described in Example 5 except for injecting 0.3 parts by weight of tetrasodium diphosphate (TSDP).

Example 7

A vinyl chloride polymer was obtained by conducting the same procedure described in Example 5 except for injecting 0.5 parts by weight of tetrasodium diphosphate (TSDP).

Example 8

A vinyl chloride polymer was obtained by conducting the same procedure described in Example 5 except for injecting 0.005 parts by weight of tetrasodium ethylenediamine tetraacetate (EDTA-4Na) instead of tetrasodium diphosphate (TSDP).

Example 9

A vinyl chloride polymer was obtained by conducting the same procedure described in Example 5 except for injecting 0.01 parts by weight of tetrasodium ethylenediamine tetraacetate (EDTA-4Na) instead of tetrasodium diphosphate (TSDP).

Example 10

A vinyl chloride polymer was obtained by conducting the same procedure described in Example 5 except for injecting 0.1 parts by weight of tetrasodium ethylenediamine tetraacetate (EDTA-4Na) instead of tetrasodium diphosphate (TSDP).

Example 11

A vinyl chloride polymer was obtained by conducting the same procedure described in Example 5 except for injecting 0.3 parts by weight of tetrasodium ethylenediamine tetraacetate (EDTA-4Na) instead of tetrasodium diphosphate (TSDP).

Example 12

A vinyl chloride polymer was obtained by conducting the same procedure described in Example 5 except for injecting 0.5 parts by weight of tetrasodium ethylenediamine tetraacetate instead of tetrasodium diphosphate (TSDP).

Example 13

A vinyl chloride polymer was obtained by conducting the same procedure described in Example 5 except for injecting 0.1 parts by weight of trisodium citrate instead of tetrasodium diphosphate (TSDP).

Example 14

A vinyl chloride polymer was obtained by conducting the same procedure described in Example 5 except for injecting 0.3 parts by weight of trisodium citrate instead of tetrasodium diphosphate (TSDP).

Example 15

A vinyl chloride polymer was obtained by conducting the same procedure described in Example 5 except for injecting 0.5 parts by weight of trisodium citrate instead of tetrasodium diphosphate (TSDP).

Comparative Example 1

A vinyl chloride polymer was obtained by conducting the same procedure described in Example 1 except for not injecting tetrasodium diphosphate (TSDP).

Comparative Example 2

A vinyl chloride polymer was obtained by conducting the same procedure described in Example 2 except for injecting tetrasodium diphosphate (TSDP) together with a vinyl chloride monomer not at a point when a polymerization conversion ratio was 50% but before initiating polymerization.

Comparative Example 3

A vinyl chloride polymer was obtained by conducting the same procedure described in Example 3 except for injecting tetrasodium ethylenediamine tetraacetate (EDTA-4Na) not at a point when a polymerization conversion ratio was 50% but before initiating polymerization.

Comparative Example 4

A vinyl chloride polymer was obtained by conducting the same procedure described in Example 4 except for injecting trisodium citrate not at a point when a polymerization conversion ratio was 50% but before initiating polymerization.

Comparative Example 5

A vinyl chloride polymer was obtained by conducting the same procedure described in Example 2 except for injecting tetrasodium diphosphate (TSDP) not at a point when a polymerization conversion ratio was 50% but at a point when a polymerization conversion ratio was 30%.

Experimental Example 1

PNMR was measured for the vinyl chloride polymer prepared in Example 1, and the results are shown in FIG. 1.

PNMR was measured at a state where the heat was not applied to the vinyl chloride polymer, after applying the heat at 205° C. for 60 seconds and 210 seconds, and after applying the heat at 205° C. for 210 seconds and washing in order to observe the change of the vinyl chloride polymer according to the degree of the application of heat.

As shown in FIG. 1, it was confirmed that the main peak of PNMR moved by degrees according to the application of heat. After washing, the original main peak was disappeared while remaining a moved peak.

A partially moved peak (2 ppm) was appeared beside a main peak (7 ppm) due to a tetrasodium diphosphate-derived unit via the combination of a portion of the tetrasodium diphosphate-derived unit with a vinyl chloride monomer-derived unit present in the vinyl chloride polymer according to the present invention (refer to FIG. 1A). In addition, the tetrasodium diphosphate-derived unit and the vinyl chloride monomer-derived unit made a covalent bond by applying heat, and the main peak was moved by degrees, thereby weakening the peak strength thereof and enlarging a partially moved peak beside thereof (refer to FIGS. 1B and 1C).

From the results of PNMR after washing (FIG. 1D), it would be found that a portion of the tetrasodium diphosphate-derived unit made a covalent bond with the vinyl chloride monomer-derived unit. Particularly, in the case where tetrasodium diphosphate was dissolved well in water and did not make a covalent bond with the vinyl chloride monomer-derived unit but remain, the PNMR peak would rarely appear after washing. However, the PNMR peak was observed after washing for the vinyl chloride polymer according to an embodiment of the present invention, and this result meant that the tetrasodium diphosphate-derived unit and the vinyl chloride monomer-derived unit made a covalent bond.

Experimental Example 2

For comparing physical properties of each vinyl chloride polymer prepared in Example 2 and Comparative Examples 1 and 2, the weight average molecular weight and the polydispersity index of each polymer were measured. The results are shown in the following Table 1 and FIG. 2.

TABLE 1

| Division | Number average molecular weight (Mn) | Weight average molecular weight (Mw) | Polydispersity index |
| --- | --- | --- | --- |
| Example 2 | 71,458 | 161,129 | 2.26 |
| Comparative Example 1 | 69,319 | 141,425 | 2.31 |
| Comparative Example 2 | 65,567 | 160,554 | 2.54 |

As shown in Table 1 and FIG. 2, the vinyl chloride polymer of Example 2 according to an embodiment of the present invention have the similar degree of polydispersity index as that of the vinyl chloride polymer of Comparative Example 1. However, the vinyl chloride polymer of Comparative Example 2 showed increased polydispersity index.

Particularly, the vinyl chloride polymer of Example 2 polymerized by injecting the modifier at a point of a specific polymerization conversion ratio showed the similar degree of polydispersity as that of the common vinyl chloride polymer of Comparative Example 1 prepared without using a modifier. However, the vinyl chloride polymer of Comparative Example 2 prepared by injecting the same amount of the modifier as in Example 2 but injecting the modifier together with a vinyl chloride monomer before initiating polymerization, showed increased polydispersity index. Therefore, the vinyl chloride polymer prepared by the preparation method according to an embodiment of the present invention has even molecular weight and has been easily prepared. In addition, thermal stability may be attained due to the modifier without seriously affecting the physical properties of a common vinyl chloride polymer.

Meanwhile, with respect to the time required for completing polymerization, the polymerization time of the vinyl chloride polymer of Example 2 according to an embodiment of the present invention was similar to that of the vinyl chloride polymer of Comparative Example 1, however the polymerization time of the vinyl chloride polymer of Comparative Example 2 was at least 1.5 times. From the results, the preparation method according to an embodiment of the present invention is found to be effective in consideration of productivity and economy.

Experimental Example 3

Physical properties of vinyl chloride polymers prepared in Examples 2 to 15 and Comparative Examples 1 to 5 were measured, compared and analyzed, and the results are shown in the following Table 2, and FIGS. 3 and 4.

1) Viscosity

The viscosity of the vinyl chloride polymers of Examples 2 to 15 and Comparative Examples 1 to 5 were compared and analyzed.

For the vinyl chloride polymers prepared in Examples 2 to 15 and Comparative Examples 1 to 5, 100 g of each vinyl chloride polymer and 60 g of dioctyl phthalate (DOP) were stirred using a Werke mixer (Eurostar IKA) for 10 minutes at 800 rpm to prepare a plastisol.

The viscosity of each plastisol thus prepared was measured using a viscometer (AR2000EX peltier plate, 40 mm parallel plate, gap 500 μm).

2) Thermal Stability

The thermal stability of each vinyl chloride polymer prepared in Examples 2 to 15 and Comparative Examples 1 to 5 were compared and analyzed.

Particularly, thermal stability was measured using each plastisol prepared in 1) for each vinyl chloride polymer of Examples 2 to 15 and Comparative Examples 1 to 5. Each plastisol was spread on a release paper and coated using a 0.5 mm rod, and then, dried at 150° C. for 45 seconds using a Mathis oven to manufacture a pregelling sheet. Heat was applied at 205° C. to each sheet thus manufactured, and change was observed with respect to time lapse of 60 seconds, 80 seconds, 110 seconds, 120 seconds, 150 seconds, 180 seconds, and 210 seconds. The results are shown in FIGS. 3 and 4. In addition, yellowness index was measured at 120 seconds using a colorimeter.

3) Dehydrochlorination Amount 10 g of each vinyl chloride polymer of Examples 2 to 15 and Comparative Examples 1 to 5 was injected to a small reactor and was heated to 180° C. The hydrochloric acid thus produced was collected in 200 mL of distilled water and the pH thereof was measured to calculate the amount of hydrochloric acid produced.

TABLE 2

| Division | Viscosity (Pa · s) | Thermal stability (Y.I) | Dehydrochlorination amount (mol/L, ×10$^{-6}$) |
|---|---|---|---|
| Example 2 | 3.6 | 75 | 1.4 |
| Example 3 | 3.3 | 69 | 1.5 |
| Example 4 | 3.4 | 67 | 1.6 |
| Example 5 | 3.0 | 72 | 1.3 |
| Example 6 | 3.1 | 63 | 1.2 |
| Example 7 | 3.1 | 60 | 1.1 |
| Example 8 | 3.2 | 98 | 1.9 |
| Example 9 | 3.2 | 87 | 1.8 |
| Example 10 | 3.9 | 62 | 1.5 |
| Example 11 | 8.8 | 52 | 1.4 |
| Example 12 | 12.0 | 51 | 1.2 |
| Example 13 | 2.9 | 63 | 1.35 |
| Example 14 | 3.1 | 59 | 1.31 |
| Example 15 | 3.1 | 52 | 1.3 |
| Comparative Example 1 | 3.1 | 124 | 2.4 |
| Comparative Example 2 | 3.6 | 116 | 2.2 |
| Comparative Example 3 | 3.3 | 105 | 2.0 |
| Comparative Example 4 | 3.4 | 108 | 2.2 |
| Comparative Example 5 | 3.4 | 110 | 2.2 |

As shown in Table 2, the vinyl chloride polymers of Examples 2 to 15 have a decreased amount of dehydrochlorination and markedly improved thermal stability (markedly low yellowness index) when compared to the vinyl chloride polymers prepared in Comparative Examples 1 to 5.

Particularly, the vinyl chloride polymer of Comparative Example 1 prepared by not adding any modifier suggested in the present invention has an increased amount of dehydrochlorination and markedly deteriorated thermal stability when compared to those of the vinyl chloride polymers of Examples 2 to 15.

In addition, by adding the modifier, the vinyl chloride polymers of Examples 2 to 15 according to an embodiment of the present invention has a decreased amount of dehydrochlorination and better thermal stability when compared to the vinyl chloride polymers of Comparative Examples 2 to 5 prepared by adding the modifier not at a point when a polymerization conversion ratio was 50% or more but at the initiating point of polymerization (polymerization conversion ratio of 0%) or at a point when a polymerization conversion ratio was 30%. The results mean that the physical properties of the vinyl chloride polymers may be improved by adding the modifier, and vinyl chloride polymers having more preferable physical properties may be obtained by controlling the injection time of the modifier.

The invention claimed is:

1. A vinyl chloride polymer, comprising:
   a vinyl chloride monomer-derived unit; and
   a modifier-derived unit,
   wherein the modifier is selected from the group consisting of citric acid, trisodium citrate, inorganic phosphates, and ethylenediamine tetraacetates,
   wherein a polydispersity index (PDI) of the vinyl chloride polymer is from 2.1 to 2.4.

2. The vinyl chloride polymer of claim 1, wherein a weight average molecular weight of the vinyl chloride polymer is from 10,000 g/mol to 20,000 g/mol.

3. The vinyl chloride polymer of claim 1, wherein at least a portion of the modifier-derived unit is bonded with the vinyl chloride monomer-derived unit.

4. The vinyl chloride polymer of claim 3, wherein the vinyl chloride monomer-derived unit has a modification ratio by the modifier-derived unit from 0.01 mol % to 2.5 mol %.

5. The vinyl chloride polymer of claim 1, wherein the inorganic phosphate is disodium diphosphate, or tetrasodium diphosphate.

6. The vinyl chloride polymer of claim 1, wherein the ethylenediamine tetraacetate is disodium ethylenediamine tetraacetate, or tetrasodium ethylenediamine tetraacetate.

7. The vinyl chloride polymer of claim 1, wherein the polymer comprises an inorganic phosphate modifier-derived unit and satisfies the following Mathematical Formula 1:

$$0.01 \leq B/A \leq 0.5 \quad \text{[Mathematical Formula 1]}$$

in Mathematical Formula 1,

A is an integral value of peaks appeared in a range from 5 ppm to 10 ppm in PNMR, and B is an integral value of peaks appeared in a range from −5 ppm to 5 ppm in PNMR.

8. The vinyl chloride polymer of claim 1, wherein the polymer comprises an inorganic phosphate modifier-derived unit and satisfies the following Mathematical Formula 2:

$$0.01 \leq D/C \leq 0.8 \quad \text{[Mathematical Formula 2]}$$

in Mathematical Formula 2,

C is an integral value of peaks appeared in a range from 2.5 ppm to 7.5 ppm in PNMR after leaving the polymer at 205° C. for 210 seconds, and D is an integral value of peaks appeared in a range from −5 ppm to 2.5 ppm in PNMR after leaving the polymer at 205° C. for 210 seconds.

9. A method of preparing the vinyl chloride polymer of claim 1, the method comprising adding a modifier to a vinyl chloride monomer, and polymerizing the monomer, wherein the modifier is at least one selected from the group consisting of citric acid, trisodium citrate, inorganic phosphates, and ethylenediamine tetraacetates.

10. The method of preparing a vinyl chloride polymer of claim 9, wherein the modifier is injected in an amount ratio from 0.01 to 10 parts by weight relative to 100 parts by weight of the vinyl chloride polymer.

11. The method of preparing a vinyl chloride polymer of claim 9, wherein the polymerizing is conducted by an emulsion polymerization, and the emulsion polymerization is micro-seed emulsion polymerization, micro emulsion polymerization, or pure emulsion polymerization.

12. The method of preparing a vinyl chloride polymer of claim 9, wherein the polymerizing is conducted in the presence of a polymerization initiator, and the polymerization initiator is used in an amount ratio from 0.01 to 3 parts by weight relative to 100 parts by weight of the vinyl chloride monomer.

13. The method of preparing a vinyl chloride polymer of claim 9, wherein the polymerizing is conducted at a temperature ranging from 30° C. to 70° C.

* * * * *